Jan. 23, 1934.    G. A. BARKER    1,944,160
WINDSHIELD
Filed April 13, 1932
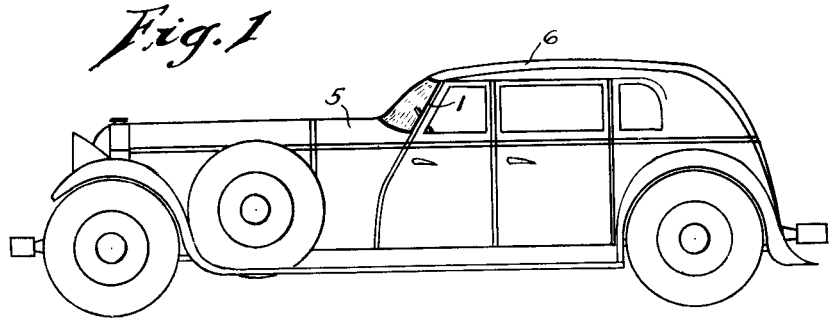
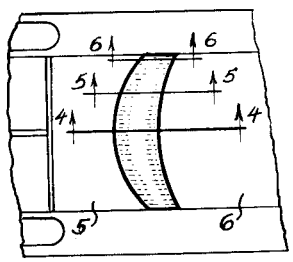
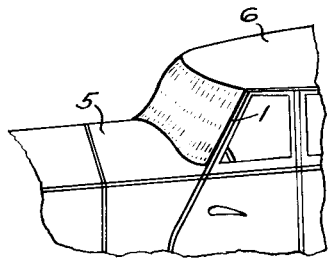
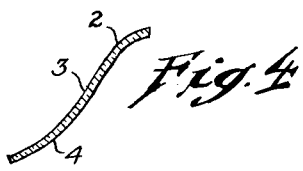
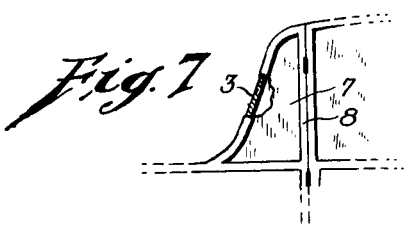
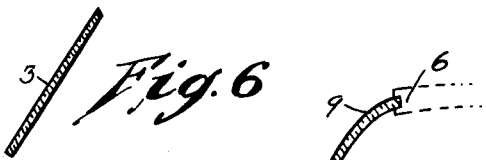
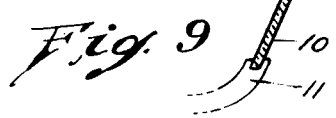
INVENTOR
George A. Barker
By *George J. Hill*
Atty Patented Jan. 23, 1934

1,944,160

UNITED STATES PATENT OFFICE 1,944,160

WINDSHIELD

George A. Barker, Rochester, N. Y.

Application April 13, 1932. Serial No. 605,087

5 Claims. (Cl. 296—84)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to windshields for automobiles, aeroplanes, and the like, and has for its object to provide a construction which is more efficient in use than those heretofore proposed.

The many novel features of the invention include increase in range of vision, reduced refraction with its consequent distortion, and reduction of wind resistance.

With these and other objects in view the invention resides in the novel details of construction and combinations of parts as will be disclosed more fully hereinafter and particularly pointed out in the claims.

Referring to the accompanying drawing forming a part of this specification in which like numerals designate like parts in all the views, Fig. 1 is a side elevation of an automobile to which this invention has been applied;

Fig. 2 is a partial top plan view of the automobile illustrated in Fig. 1 and showing the curvature of the windshield;

Fig. 3 is a perspective view of the windshield shown in Figs. 1 and 2;

Figs. 4, 5 and 6 are vertical sectional views of the windshield shown in Fig. 2, said views being taken as on the lines 4—4, 5—5 and 6—6 respectively of said figure;

Fig. 7 is a detail in side elevation, partly broken away, illustrating a modified form of windshield construction;

Fig. 8 is a vertical sectional view of the windshield shown in Fig. 7; and

Fig. 9 is a modification of the windshield construction shown in Figs. 1 and 7.

In order that this invention may be better understood, reference is made to well known prior windshield constructions comprising flat pieces of glass which have been disposed in a truly vertical plane or in a plane slightly inclined to the vertical, and further comprising cylindrically formed pieces of glass. This invention, on the other hand, contemplates a departure from such known windshields in that it is directed to a piece of glass having a plurality of curves. With heretofore known types of windshields the angles of visibility therethrough by the driver of the vehicle have been of a certain maximum scope, and it is an important feature of this invention to increase the extent of these angles to the end that the driver can view a much large area, outside the vehicle but within the confines of the limiting edges of the windshield, than has been heretofore possible. These angles of visibility are both of vertical and horizontal extent.

In Fig. 1 there is shown in elevation an automobile, provided with a windshield the conformation of which is better illustrated in Figs. 2, 4, 5 and 6. This windshield comprises a sheet of glass which is curved or bowed as clearly indicated in Fig. 2 with the median of the bow lying in the longitudinal center line of the vehicle. That is to say, the windshield with one side edge mounted in the forward roof-supporting stanchion 1 extends arcuately forwardly and across said vehicle to the central longitudinal plane thereof, and then it extends arcuately rearwardly of the vehicle in the direction toward, and terminating in, the corresponding but opposite roof-supporting stanchion.

The radius of this curvature or bow may be varied, in Fig. 2 the center of curvature being at a point which would be slightly to the rear of the back of the driver's seat. In any event the curvature is such as to cause the forward side stanchions to assume positions much nearer to the driver than are the stanchions of the heretofore known types of construction, thereby materially increasing the unobstructed horizontal angle of visibility of the driver.

Fig. 4 is a vertical sectional view of the windshield shown in Fig. 1, taken as on the longitudinal center line of the vehicle, and clearly shows that the windshield is provided with a plurality of curves or bends which are reflex with respect to each other. In other words, adjacent the top edge of the windshield there is a bend 2 extending forwardly and downwardly, joining a substantially straight central portion 3, which in turn joins the downwardly and forwardly extending bend 4 terminating in the bottom edge of the windshield which is adapted to be mounted in the cowl 5. The bend 4 is shown of slightly greater radius than the bend 2, and is formed in a reverse manner to said bend 2, the bends 2 and 4 together with the intermediate portion 3 forming a cross-section of S shape. Obviously the curvature of the bend 4 could be made equal to or less than the curvature of the bend 2 to suit the style of vehicle body construction.

Fig. 5 is a similar sectional view taken substantially mid-way between the central longitudinal center line of the vehicle and the extreme side edge of the windshield. This view clearly shows the straightening out of the windshield or, in other words, the lengthening of the central substantially straight portion 3 terminating in the bends 2 and 4 which are of lesser extent than the same bends shown in Fig. 4. Fig. 6 shows a vertical sectional view of the windshield, adjacent the forward roof-supporting stanchions, from which it will be seen that at this point the windshield is substantially straight from top to bottom edge, and therefore devoid of any bends. In other words, this windshield is bowed in a direction from side to side, and is provided with reflex bends at top and bottom edges, which bends change in curvature from a maximum midway the side edges to a minimum at said side edges.

From this construction it will therefore readily be seen that by the bend 2 at the top of the windshield it is possible to foreshorten the forward extent of the roof 6 of the vehicle and therefore to increase materially the vertical angle of visibility of the driver. In automobiles, this increase of visibility is valuable in more readily permitting the driver to see the traffic lights when he is in close proximity thereto, said lights being mounted at points several feet above the roof of the vehicle. Also such a construction is adapted for better drainage of rain, and is extremely valuable as an aid in lessening wind resistance.

The modification, shown in Figs. 7 and 8, is of a windshield having the reverse bends 2 and 4 with intermediate substantially straight sections 3, but this windshield is not bowed, extending straight across the vehicle between the side stanchions.

This necessitates the provision of substantially triangularly shaped side windshield glasses, indicated at 7, to fit the space between the side edges of the front windshield and the roof-supporting stanchion 8 which normally engages one side of the vehicle door. In this construction we have a windshield, comprising a front glass having at each end thereof a side glass, providing substantially the same increased vertical and horizontal visibility as above mentioned, but in this case the horizontal visibility is slightly interupted by the S shaped corner mountings of the windshield.

In Fig. 9 there is illustrated a modification wherein the windshield is provided at the top edge with a bend 9 corresponding to the bend 2 above described, as well as with a substantially straight portion 10 similar to the corresponding part 3 in the preceding figures. The glass portion of the windshield, however, stops with the straight portion 10 or, in other words, is devoid of the bottom forwardly extending bend 4, the lowermost edge of the windshield glass being mounted in an upturned and/or curved portion 11 of the cowl, the roof 6 being joined to the upper edge of the windshield glass as in the preceding construction. The windshield glass of this modification may extend either straight across the vehicle, or it may be bowed in a manner corresponding to the windshield shown in Fig. 2. With a straight glass there may be provided suitable triangularly shaped panes of glass at the sides of the vehicle corresponding to the panes 7 shown in Fig. 7, or the straight glass may have its opposite side edges mounted in stanchions similar to those shown in Fig. 3, according to the style of vehicle body.

It is obvious that those skilled in the art may vary the details of construction and combinations of parts without departing from the spirit of the invention, and therefore it is not desired to be limited to the foregoing except as may be required by the claims.

What is claimed is:—

1. A windshield comprising a piece of glass provided with reflex bands at top and bottom edges, said bends changing in curvature from a maximum midway the side edges to a minimum at said side edges.

2. A windshield comprising a piece of transparent material provided with reflex bends at top and bottom edges, said bends diminishing in curvature from maximum midway the side edges to zero at said side edges.

3. A windshield comprising a piece of glass bowed in its extent from side to side of the vehicle and provided with reflex bends at top and bottom edges, said bends diminishing in curvature from maximum midway the side edges to zero at said side edges.

4. A windshield comprising a piece of glass bowed in its extent from side to side of the vehicle and formed at its upper and lower edges with reflex curved surfaces in its vertical extent, the curvature of said surfaces changing from maximum midway the side edges to minimum at the side edges.

5. A windshield comprising a frame provided with straight side edges, said frame extending from side to side of the vehicle, a piece of glass mounted in said frame, said piece of glass formed with reflex curved surfaces in its vertical extent, the curvature of said surfaces changing from maximum midway the side edges to minimum at the side edges.

GEORGE A. BARKER.